(12) United States Patent
Pulli et al.

(10) Patent No.: US 7,733,341 B2
(45) Date of Patent: Jun. 8, 2010

(54) THREE DIMENSIONAL IMAGE PROCESSING

(75) Inventors: Kari Pulli, Palo Alto, CA (US); Asger Strandtoft, Smorum (DK)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/130,193

(22) Filed: May 30, 2008

(65) Prior Publication Data
US 2008/0303816 A1    Dec. 11, 2008

Related U.S. Application Data

(62) Division of application No. 10/531,198, filed on Dec. 12, 2005, now Pat. No. 7,391,418.

(51) Int. Cl.
G06T 15/00    (2006.01)

(52) U.S. Cl. ........................ 345/421; 345/531; 345/423; 345/582

(58) Field of Classification Search .................. 345/421, 345/531, 423, 427, 582
See application file for complete search history.

(56) References Cited

U.S. PATENT DOCUMENTS

| 5,325,485 | A | * | 6/1994 | Hochmuth et al. | 345/505 |
| 5,835,095 | A | * | 11/1998 | Smith et al. | 345/421 |
| 5,999,187 | A | * | 12/1999 | Dehmlow et al. | 345/420 |
| 6,292,194 | B1 | * | 9/2001 | Powell, III | 345/582 |
| 6,426,747 | B1 | * | 7/2002 | Hoppe et al. | 345/419 |
| 6,525,722 | B1 | * | 2/2003 | Deering | 345/419 |
| 7,088,362 | B2 | | 8/2006 | Mori et al. | |
| 7,391,418 | B2 | * | 6/2008 | Pulli et al. | 345/421 |

FOREIGN PATENT DOCUMENTS

EP    1227443 A2    7/2002

OTHER PUBLICATIONS

Flynn, P.J. "3-D Object Recognition with Symmetric Models: Symmetry Extraction and Encoding." IEEE Transactions on Pattern Analysis and Machine Intelligence, IEEE Service Center, Los Alamitos, CA, US, vol. 16, No. 8, Aug. 1, 1994, pp. 814-818.

* cited by examiner

*Primary Examiner*—Phu Nguyen
(74) *Attorney, Agent, or Firm*—Perman & Green, LLP

(57) ABSTRACT

A method and apparatus for storing object files containing triangle strips and displaying the triangle strips in the order in which they were created and stored in the object files.

7 Claims, 7 Drawing Sheets

THREE DIMENSIONAL IMAGE PROCESSING

CROSS-REFERENCE TO RELATED APPLICATIONS

This application is a divisional of, claims the benefit of and priority to U.S. patent application Ser. No. 10/531,198, filed on Dec. 12, 2005, now U.S. Pat. No. 7,391,418, issued on 24 Jun. 2008, which is the National Stage of International Application No. PCT/EP2002/011507, International Filing Date Oct. 15, 2002, which designated the United States of America and which international application was published under PCT Article 21(2) as WO Publication No. WO 2004/036504 A1, the disclosures of each being incorporated herein by reference in their entirety.

BACKGROUND

1. Field

The disclosed embodiments relate to a method of preparing object files on a first device that are used for rendering two-dimensional images of three-dimensional objects on a second device. The object files contain data defining polygon primitives representing at least one three-dimensional object. The data in the object file is rearranged for determining a rendering order in which said polygon primitives may be rendered in which the hidden surface problem is solved. The invention relates further to a mobile communication terminal comprising image processing means for rendering images of three-dimensional objects on a display. The present invention relates also to a method of rendering two-dimensional images of three-dimensional objects by processing data defining polygon primitives with a reduced amount of vertex data. The invention further relates to a mobile communication terminal comprising image processing means for rendering images of three-dimensional objects on a display capable of displaying an image on the basis of a reduced amount of vertex data.

2. Brief Description of Related Developments

Until recently, animated three-dimensional graphics were exclusively applied in devices with a relatively high processing power such as, for instance, in generating displays of the appearance of an object from several angles on a workstation or a PC during computer aided design and computer aided manufacture, in electronic video arcade games, or in driving- or flight simulators.

Three-dimensional graphics now also find their way into devices with a relatively low processing power such as mobile phones, personal digital assistants (PDA) and hand-held video games.

To provide animation, it is necessary to update the image at rates approaching 20 to 30 frames per second (lower rates are acceptable for some applications), so that an observer perceives the image as a continuous change rather than a chain of static images.

The speed at which the apparatus can perform calculations, coupled with the minimum acceptable frame rate, provides a limit to the number of calculations which can be performed to generate each image.

In three-dimensional animation, it is necessary to calculate for each image the projection of the three-dimensional objects on two dimensions. For complex images a large amount of calculations can be required.

Image synthesis is usually performed by representing an object as a number of polygon primitives defined by vertices, projecting the polygon primitives onto an image plane, and then processing each polygon primitive in order to define, for each pixel of the projected polygon, the pixel color.

A major problem in rendering three-dimensional graphics is the removal of hidden surfaces. From the viewpoint, the nearer surfaces should obscure the further parts.

A common approach is to test, when a given pixel is rendered, whether it lies in front (and therefore occludes) or behind, (and therefore is occluded by) the pixel (if any) which is already within the image buffer. Accordingly, each pixel needs to be assigned a depth value. This technique is referred to as the "z-buffer algorithm". This technique is a technically simple approach, but it is resource intensive in terms of storage and processing power since it involves a large number of comparison operations (on the order of the number of pixels in the image buffer), for real time operation.

The "Painter's Algorithm" examines the coordinates of the vertices of the polygons, and ranks the polygons into order of decreasing distance from the viewpoint. The polygons are then rendered in order of decreasing distance, so that the pixels of the most distant polygons are first written into the image buffer, and are overwritten as necessary by those of nearer polygons. However, this technique requires the sorting operation of all polygons to be repeated each time the viewpoint changes, and consequently, requires a large amount of computation in real time.

In a known technique, polygons are viewed as having two faces; one face directed inwardly towards the interior of the object (the "back" face) and one face directed outwardly of the object (the "front" face). For a solid object, the "back" face of a polygon is never visible; only polygons which face forwards therefore need to be displayed. Accordingly, a decision is made prior to rendering whether, from the viewing angle concerned, a given polygon is showing its front (outer) or back (inner) face, and only those polygons which are facing forward are rendered. This method of back face culling reduces the problem of hidden surface removal, but does not eliminate the problem altogether.

A further known technique is known as "binary space partitioning" (BSP). In this technique, prior to animation, a pre-processing stage is performed in which a tree-structured model is built in memory, each node in the tree being a polygon on a space partitioning plane and pointing to successor and predecessor nodes (if any). One of the nodes contains a tree consisting of polygons strictly on one side of the partitioning plane, while the other node contains the rest. One can then recursively process the tree (descending first to the node further away from the camera) and render polygons in back to front order.

Another known technique is polygon stripping i.e. to convert independent triangles or polygons into triangle strips. In this technique, a first triangle is identified with an either clockwise or counterclockwise winding, and then all subsequent triangles in the strip will alternate winding. The strip is continued until the triangle strip runs off the edge of the object or runs into a polygon that is already a part of another strip.

Traditionally, due to their extensive consumption of system resources, three-dimensional graphics engines belong to high performance systems such as workstations with powerful processors and large memories. The restrictions posed by limited calculation power are more evident on devices which cannot be provided with the fastest processors. Examples of such devices are mobile phones, personal digital assistants (PDA) and handheld video games. There is therefore a need to provide effective algorithms so that three-dimensional real time animated graphics can be handled by the processing power available in the above-mentioned devices.

SUMMARY

On this background, the aspects of the disclosed embodiment to provide a method of preparing on a first device object files used for rendering two-dimensional images of three-dimensional objects on a second device to determine a rendering order in which said triangle primitives may be rendered for creating a two-dimensional image in which the hidden surfaces are removed, which allows real time three-dimensional image rendering on devices with relatively low processing power.

In one aspect, the disclosed embodiments are directed to providing a method of preparing object files on a first device that are used for rendering two-dimensional images of three-dimensional objects on a second device by processing object files containing data defining triangle primitives representing at least one three-dimensional object to determine a rendering order in which said triangle primitives may be rendered for creating a two-dimensional image in which the hidden surfaces are removed comprising the steps of:

storing a plurality of planar triangle primitives corresponding to a plurality of surface portions of said at least one object in an object file, wherein said plurality of triangle primitives are represented by vertex data arranged according to an original order, selecting a triangle that does not potentially occlude any of the unprocessed triangles to start a triangle strip, selecting a neighboring triangle to add to the last triangle in the triangle strip, determining whether the selected triangle can potentially occlude any of the unprocessed triangles, adding the selected triangle to the strip and going back to step c) if the selected triangle cannot potentially occlude any of the unprocessed triangles, going back to step b) to start a new triangle strip if the selected triangle can potentially occlude any of the unprocessed triangles, and repeating steps b) to f) until all the triangles in the object file are processed.

Thus, the object files can be reorganized in triangle strips that can be displayed in the order in which they were created whilst the hidden surface problem is solved, i.e. the device that receives the thus prepared object files can simply display the triangle strips and the triangles in the order in which they are stored in the object file without the need for calculations to solve the hidden surface problem. The number of calculations to be made by the image-processing device is thus significantly reduced by pre-sorting the vertex data such that the rendering order of the triangle primitives in the triangle strips is correct, i.e. the hidden surfaces are correctly removed, independent of the viewing direction and the camera position. Thus, the second device only needs to calculate the rendering order of the objects and then, for each frame of animation, to render the front facing triangle primitives of the objects in the order that they are stored in the object files. Compared to Z-buffering, for example, a large reduction in the amount of calculations that are required can be obtained as no comparison of the pixel's previous Z-value is required.

Step b) of the method preferably comprises a heuristic search to identify those triangles for starting a strip that potentially allow long strips to be formed, preferably by selecting triangles that do not have many unprocessed neighbors.

For some objects there is no order in which the triangle primitives can be placed in which the hidden surfaces are removed correctly for all viewing directions because of conflicting occlusion priorities. Thus, it is necessary to split such an object into two objects and presort the triangle primitives for each thus created object.

The method preferably comprises on said first device further the step of:

dividing the object file into two if at step b) it is impossible to find a triangle not occluding other, still unprocessed, triangles.

The object is preferably divided by using a partitioning plane, with which at least one of the unprocessed triangles remains on a different side than the unprocessed triangles it can potentially occlude.

Preferably, a plane of an arbitrary unprocessed triangle is used and the triangle is associated on the outward side of the splitting plane, thus leaving all the polygons that it may cover on the other side.

While dividing the polygons into two sets, one may have to split polygons that intersect the partitioning plan. In general, it is beneficial to split polygons into two sets such that the number of polygons in the two sets is as equal as possible.

The method preferably comprises further the step of determining the front side and the triangle planes of the triangles in the object file wherein the determination if a selected triangle can occlude any of the unprocessed triangles comprises the steps of determining whether:

the selected triangle has one or more vertices on the front side of the plane of any of the unprocessed triangles, and whether any of the unprocessed triangles positively identified in step g) have one or more vertices on the backside of the plane of the selected triangle.

The method may further comprise on said first device the following steps before step b)

determining if the object has symmetry in the XY-plane of the object space, storing a determined plane of symmetry, and removing all vertices in the object file from one side of a determined plane of symmetry, and repeating steps i) to k) for the XZ-plane of the object space and for the YZ-plane of the object space.

The method preferably comprises:

transferring said object file or files from said first device to a second device after step f) or k) and storing the object files on said second device.

The first device preferably comprises a higher performance image processing means, such as used in a PC or a workstation and said second device preferably comprises a lower performance processing means such as used in a mobile communication terminal or a PDA.

Thus, the calculation intensive part of the image rendering process can be carried out in advance on a device with a high processing power such as a workstation or a PC, and the animated three-dimensional graphics can be rendered in real time on a device with relatively low processing power such as a mobile phone, a PDA or a handheld video game.

In another aspect, the disclosed embodiments provide a method for displaying object files obtained by the method above on the second device. In one embodiment, a method comprises:

determining the viewing direction, and determining the object order, preferably using the painter's algorithm and displaying said object or objects on said second device.

Preferably, the method further comprises the step of:

culling all triangles facing backwards relative to said viewing direction.

The method advantageously comprises the steps of:

retrieving planes of symmetry stored in the object file, and creating a duplication of the vertex data present in the object file, said duplication of the vertex data having the same order as the original vertex data and being stored in the object file after the original vertex data, and flipping the sign of the vertex values on the axis orthogonal to the respective retrieved plane of symmetry of the duplicated vertices.

Recreate vertices by flipping the sign of one of the coordinates, can only be carried out if and only if the plane of symmetry is one of x=0, y=0, z=0. If the plane is, e.g., x=1, and there is a vertex 0,1,2, the mirror pair cannot be obtained by flipping the sign of x component. Instead it would be necessary to mirroring it with respect to the coordinate x=1, so that the mirror pair would be 2,1,2. The method may therefore comprise the steps of translating and rotating the object so that the axes of symmetry match with x=0, y=0, or z=0. During the rendering operation the inverse steps are applied to the whole object.

The method may further comprise the steps of:

displaying the triangle strips in the same order as they were created, and displaying the triangles in the triangle strips in the same order as they were added to the strip.

Thus, the triangles can be displayed directly as they are stored in the object file, independent of the viewing direction and camera position, without the second device needing to carry out calculations to resolve the hidden surface problem.

Preferably, the second device comprises a lower performance processing means such as used in a mobile communication terminal or a PDA, and most preferably the second device is a mobile phone.

The image rendering process is preferably carried out by the main CPU of the device, and all the further image rendering means is software embedded.

In a further aspect, the disclosed embodiments provide a mobile communication terminal capable of displaying real-time rendered animated three-dimensional graphics. In one embodiment, a mobile communication terminal comprises:

means to store object files containing triangle strips, and means to display said triangle strips in the order in which they have been created, which preferably corresponds to the order in which triangle strips are stored in the object files.

The triangles in the triangle strips can be displayed in the same order as they were added to the strip, which preferably corresponds to the order in which they are stored in the triangle strips.

Preferably, a rendering order of the objects is determined using a binary space partitioning method. The rendering order of the object files is sorted based on the current viewing direction and position so far away objects are rendered first.

The mobile communication terminal may comprise means for culling all triangles facing backwards relative to the viewing direction.

The mobile communication terminal may further comprise means for retrieving planes of symmetry stored in the object file, and means for duplicating all vertex data present in the object file and flipping the sign of the vertex values on the axis orthogonal to the respective plane of symmetry for the newly created triangles.

The image rendering process is preferably carried out by the main CPU of the device, and all further image rendering means is software embedded.

It is yet another aspect of the disclosed embodiments to provide a method of preparing on a first device object files used for rendering two-dimensional images of three-dimensional objects on a second device by processing data defining triangle primitives representing at least one three-dimensional object. The method requires a reduced amount of calculations and therefore allows real time three-dimensional image rendering on devices with relatively low processing power. In one embodiment, a method comprises on said first device:

storing a plurality of planar triangle primitives corresponding to a plurality of surface portions of said at least one object, wherein said plurality of triangle primitives are represented by vertex data, determining the planes of symmetry of said three-dimensional object, storing planes of symmetry data in the object file, culling all vertex data from one side of each said planes of symmetry, transferring said object file from said first device to said second device, and displaying said image on said second device by mirroring said vertex data about said planes of symmetry and rendering said image.

Preferably, planes of symmetry that are not perpendicular with one of the X-, Y- or Z-axis of the object coordinate system are ignored. Alternatively, the object may be rotated and translated so that the axes of symmetry align with one or more of the planes X=0, Y=0, or Z=0.

The first device may comprise higher performance image processing means, such as used in a PC or a workstation and said second device may comprise lower performance processing means such as used in a mobile communication terminal, a PDA or a handheld video game.

The second terminal is preferably a mobile phone.

In another aspect, the disclosed embodiments provide a mobile communication terminal capable of displaying two-dimensional images of three-dimensional objects with a reduced amount of calculations. In one embodiment, a mobile communication terminal comprises image processing means for rendering images of three-dimensional objects on a display, means for storing vertex data, means for storing planes of symmetry data and means for mirroring vertex data in a symmetry plane.

Further aspects, features, advantages and properties of the methods and mobile communication terminals according to the invention will become apparent from the detailed description.

BRIEF DESCRIPTION OF THE DRAWINGS

In the following detailed portion of the present description, the embodiments will be explained in more detail with reference to the exemplary embodiments shown in the drawings, in which.

DETAILED DESCRIPTION OF THE DISCLOSED EMBODIMENTS

Three-dimensional graphics systems provide a virtual three-dimensional (3-D) environment in which objects, light sources and a viewing position may be manipulated within a notional three-dimensional space. The viewing position provides a window into the virtual three-dimensional world, often referred to as "world space". This world space itself only exists as data defining three-dimensional coordinates and other variables, such as color and reflectivity. The two-dimensional image presented at the notional window must be created by processing the three-dimensional image data, in a procedure known as rendering.

Systems are known in which objects in the three-dimensional space are represented by the coordinate locations of selected points on the surface of the object.

However, rendering consists of allocating picture element values to two-dimensional regions of the image. Therefore, these coordinate points are converted into notional regions by effectively connecting the points by straight lines to provide a three-dimensional net of flat, two-dimensional triangles, defined by a number of vertices. The present invention will be described by using triangles, but the reader skilled in the art will appreciate that the techniques described also apply to other flat polygons.

The picture element values are generated on a triangle-by-triangle basis, until the whole object has been tessellated, i.e. broken down into triangles. The vertex data thus created is stored in an original order in the object file.

Figure 1:
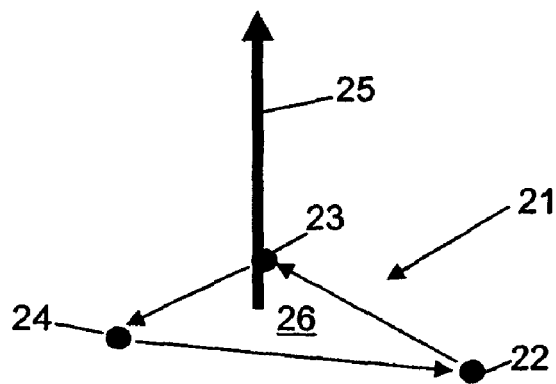
FIG. 1 is a diagram illustrating a front face of a triangle.

The triangles are saved in a manner that defines a normal vector identifying the front face (solid objects always have a front face and a back face, the latter never being visible) of the triangles. The "front" face is defined by vector normal to the surface of the triangle, with the direction of the vector (and hence the direction of the front face) being determined by a right-hand (or, optionally, left-hand) rule traversing the three vertices of the triangle in an order determined by the manner in which they are stored in the triangle's data structure. For instance, in FIG. 1, the three points 22,23,24 determine the direction of the normal vector 25, and hence the side of the triangle 21 that is to be defined as the front face 26. The normal vector 25 is e.g. determined by the cross product of two vectors along the edges of the triangle. The above steps are all carried out on a workstation, PC or similar high performance computer.

The picture element values generated by the rendering process are saved on the workstation. In order to maintain the illusion of a solid three-dimensional object when displaying the triangles on a display, it is essential that the triangles are sorted in an order which ensures that occluded triangles are rendered before the triangles which occlude them. Real-time sorting of the triangle order is unfeasible on e.g. a mobile phone with relatively low performance hardware for processing the data. In the prior art techniques, this problem was solved partially by preparing a predetermined rendering order, which could, however, change as changes are made to the viewing direction or the location of the viewpoint. As will be shown here, the technique according to the invention overcomes this problem.

The term "object" as used here includes single objects and also a collection of several separate objects, as long as the objects in that collection do not move with respect to each other during the animation, e.g. a table and a flower pot and a chair next to the table can be considered as one object, if they don't move with respect to each other. If in the course of animation the chair moves, it can't be the same object as the desk.

Figure 2:
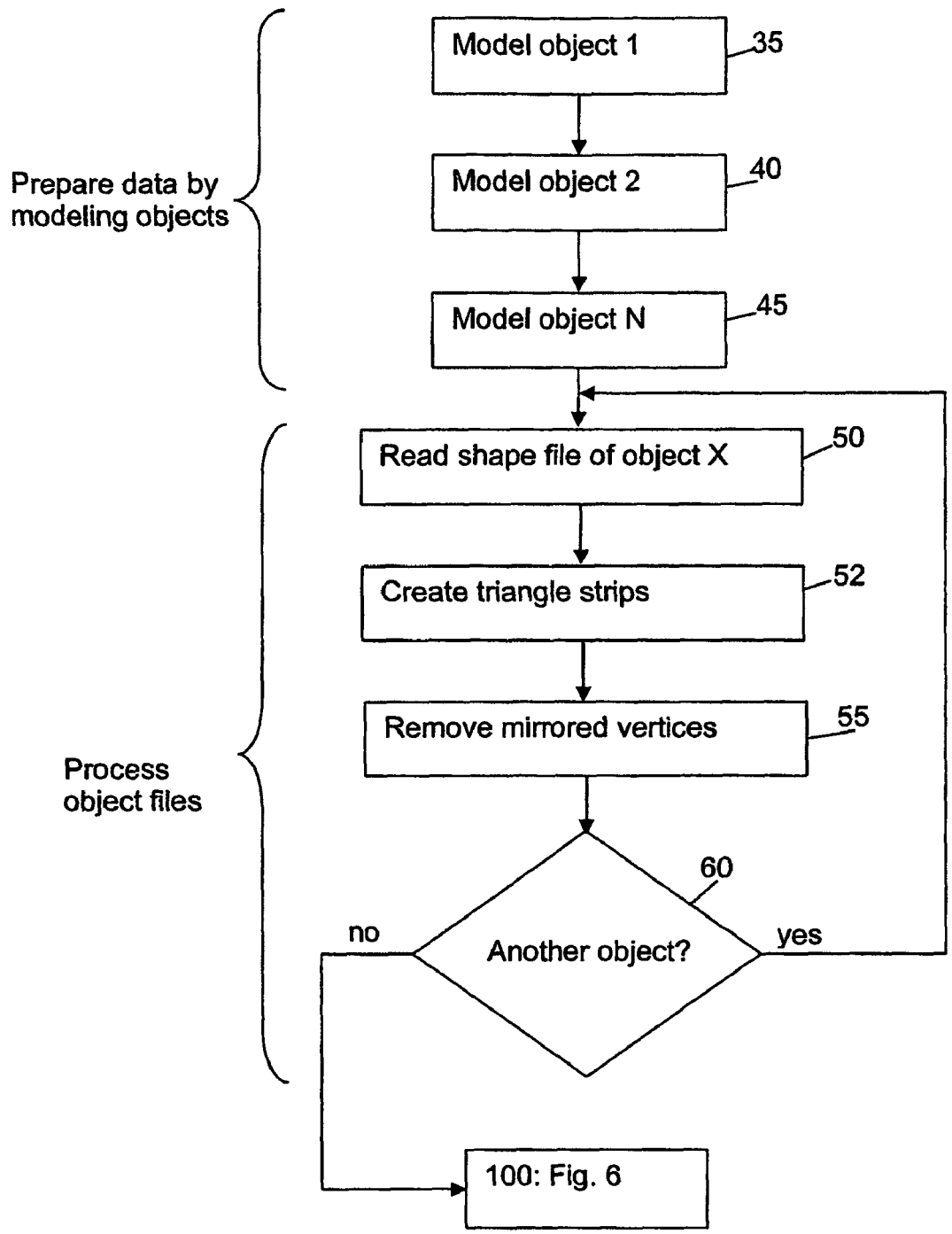
FIG. 2 is a flow chart showing two stages of creating object files of three-dimensional objects on a first device.

The stages for providing a three-dimensional graphics environment on a workstation or other powerful computer (not shown) are shown in FIG. 2. Initially, data defining the objects is prepared. Thus, at step 35, a first object is modeled. Similarly, at step 40 a second object is modeled and so on until at step 45 an Nth object is modeled. Each object is modeled with reference to its own set of coordinates, often referred to as its own modeling space. Thus, each set of object data defines a shape, and the data required to reproduce said shape in a graphics environment is stored in an object file in the form of vertex data.

The next stage consists of steps 50, 52, 55 and 60, which form part of the pre-processing stage. At step 50, an object file is read which defines the shape of the object in terms of triangle vertices and triangle surface characteristics.

At step 52 triangle strips are created by processing the data defined by the object file. The strips are created in such a way that the hidden surface problem is solved for all possible viewing directions, i.e. the object file is made hidden surface removal tolerant (HSR tolerant), so that when the strips have been created no care needs to be taken to solve the hidden surface problem, independent of viewing direction and camera position. Usually it is possible to process the complete object file in this manner whilst fulfilling the above criteria, however, sometimes it is impossible to create triangle strips in this manner for the complete object because there is a conflict in the required rendering order between triangles of the object. In such cases the object is divided into two new objects, which are each processed independently like any other object.

In the next step, step 55, it is determined whether the objects have any planes of symmetry (this information is usually already available from the object file after the modeling procedure). All triangles at one side of a plane of symmetry are removed and, if not present already, the plane of symmetry is stored in the object file.

The above steps may be required for a plurality of objects, and hence a question is asked at step 60 as to whether another object is to be processed. When answered in the affirmative, steps 50, 52, and 55 are repeated, until all objects have been processed. All the steps 35 to 60 are performed on a first device, typically a workstation with powerful graphics processing means, and once all object files have been processed they can be transferred to a second device for display, a device with lesser graphics processing power, which is typically a mobile terminal, in the present embodiment a mobile phone 1.

Figure 4:
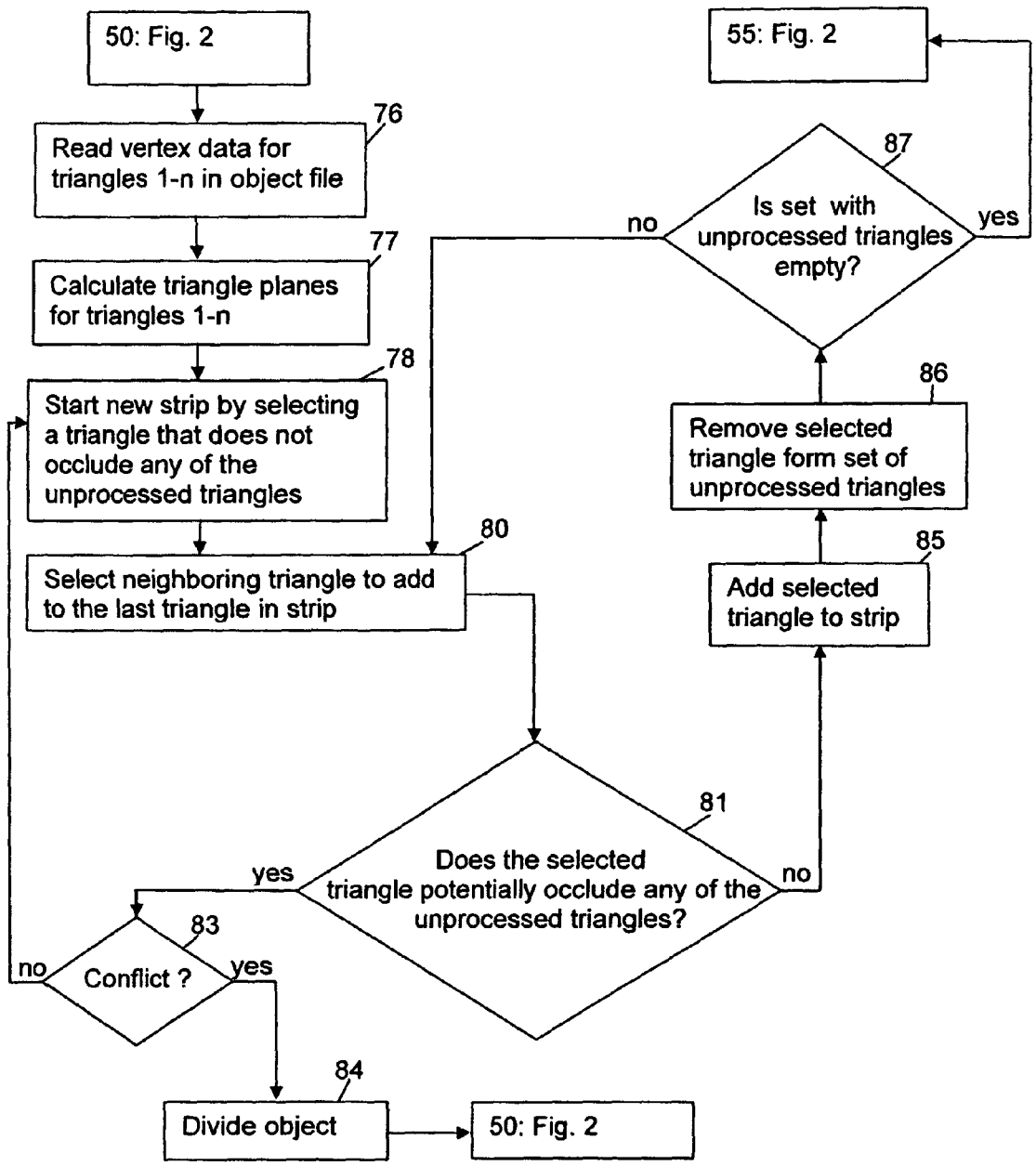
FIG. 4 is a detailed flow chart showing the steps for creating triangle strips on the first device.

Step 52 of FIG. 2, is shown in more detail in the flowchart in FIG. 4. In step 76, the vertex data of all the triangles 1-n of the object are read, starting with the number of vertices, the number of triangles, the vertex data and the triangle data. Based on the vertex data the triangle planes for each of the triangles 1-n are calculated one after another in step 77.

In step 78 a new triangle strip is started by selecting a triangle that does not occlude any of the unprocessed triangles. The selection of the first triangle may be done in a greedy style by simply choosing the first triangle in the set of unprocessed triangles.

According to an alternative embodiment of the invention, heuristic search techniques can be used to identify those triangles that potentially occlude the least number of remaining unprocessed triangles, e.g. by selecting triangles that do not have many unprocessed neighbors. Starting a new strip with thus identified triangles will result in fewer and longer triangles strips per object.

Several techniques are known to perform such a heuristic search and these techniques are therefore not described in detail here.

The triangle selected to start the strip with is then compared with the triangles in the set of unprocessed triangles to determine if the selected triangle can potentially occlude any of the unprocessed triangles. A procedure for carrying out this determination is described below with reference to FIG. 5.

In step 80 a neighboring triangle to be added to the triangle strip is selected. The selected triangle is then compared in step 81 with the triangles in the set of unprocessed triangles to determine if the selected triangle can potentially occlude any of the unprocessed triangles. The procedure for carrying out this determination is described further below with reference to FIG. 5. The selected triangle is added to the strip in step 85 if the determination in step 81 is negative. The selected triangle is then removed from the set of unprocessed triangles in step 86. In step 87 the question is asked if the set with unprocessed triangles is empty. All triangles in the object file have been processed if the question asked in step 87 is answered in the positive, and control is given to step 60 (FIG. 2). If the question asked in step 87 is answered in the negative, control is given to step 80 to select a new neighboring triangle to add to the triangle strip.

If the question asked in step 81 is answered in the positive, a check for a conflict is run in step 83, i.e. check if a circle exists such as when a first triangle can potentially occlude a second triangle, the second triangle can potentially occlude a third triangle and the third triangle can potentially occlude the first triangle. Thus it is impossible to create an object file in which the rendering order is correct for all possible viewing directions. If the check for a conflict is answered in the negative, a new triangle strip is started in step 78. If the check for a conflict is answered in the positive, the object is divided using binary space partitioning techniques, e.g. by dividing the object into two over the triangle surface of the last selected triangle. Control is then given to step 52 (FIG. 2), and the two "new" objects are processed like any of the other objects. The conflict check is performed by determining if any triangle can be selected such that it doesn't potentially cover any other unprocessed triangle. If this determination is answered in the negative, the object needs to be divided.

Figure 5:
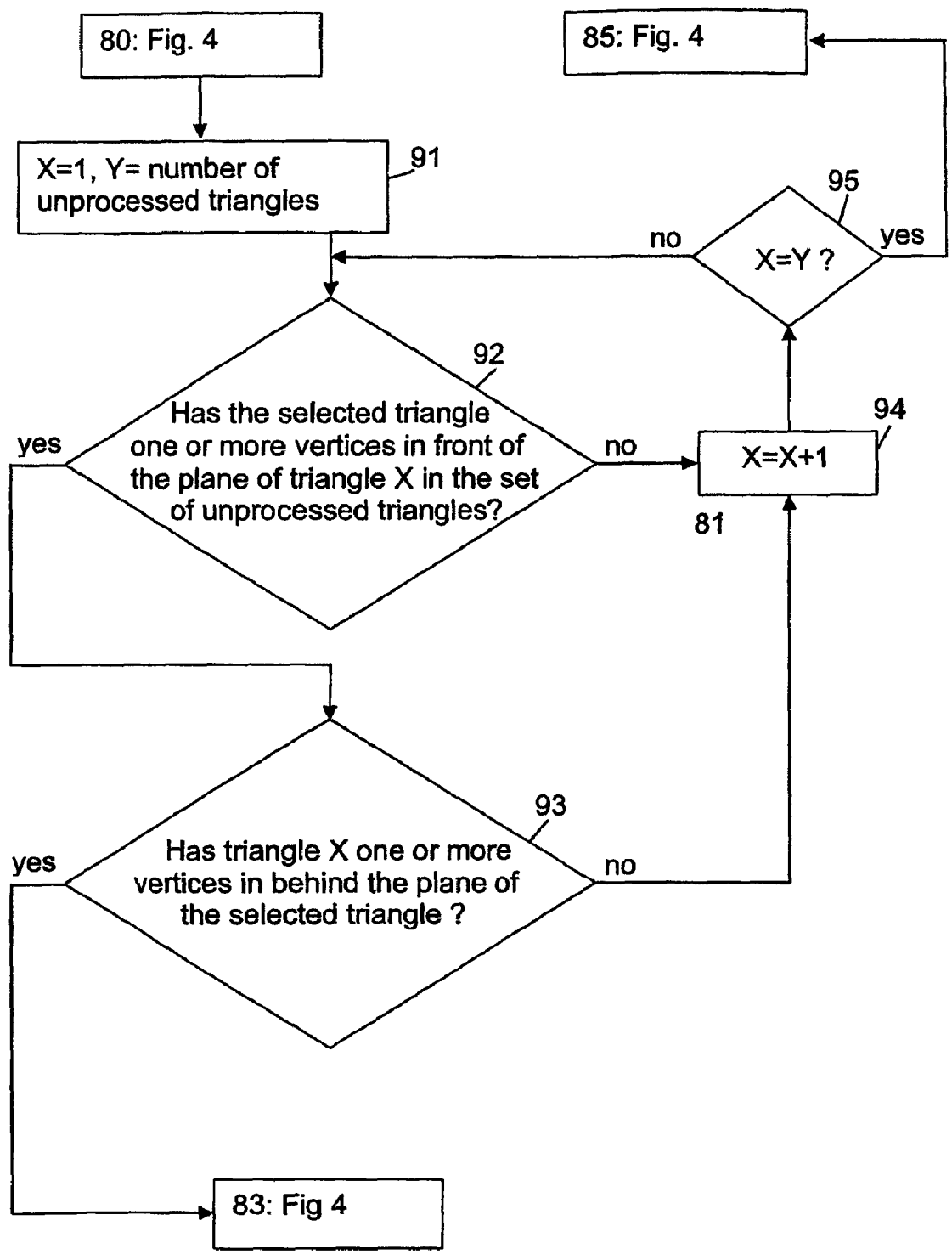
FIG. 5 is a detailed flowchart illustrating the process to determine if a selected triangle can potentially occlude an unprocessed triangle.

As best shown in the flowchart of FIG. 5 a selected triangle can be compared with the unprocessed triangles starting with step 91, in which the value for a parameter X is set to 1 and the value for a parameter Y is set equal to the number of triangles in the set of unprocessed triangles.

In step 92 the question is asked if the selected triangle has one or more vertices in front of the plane of triangle X in the set of unprocessed triangles. If the question asked in step 92 is answered in the positive, the question is asked in step 93 if triangle X has one or more vertices behind the plane of the selected triangle. If the question asked in step 93 is also answered positive control is given to step 83 (FIG. 4).

If the question asked in step 92 or 93 is answered in the negative, the value of parameter X is increased with one in step 94 and in step 95 the question is asked if the value of parameter X is equal to the value of parameter Y. When the question asked in step 95 is answered in the negative, the procedure of steps 92, 93, 94 and 95 is repeated until the question asked in step 95 is answered in the positive. Then control is given to step 85 to add the selected triangle to the triangle strip.

The above procedure is repeated until the set with unprocessed triangles is empty, and the object file is in a format in which the triangles are in an order in which they can be displayed without needing to solve the hidden surface problem. Further, the triangles are arranged in triangle strips and therefore the amount of calculations to display the object is further reduced.

Figure 3:
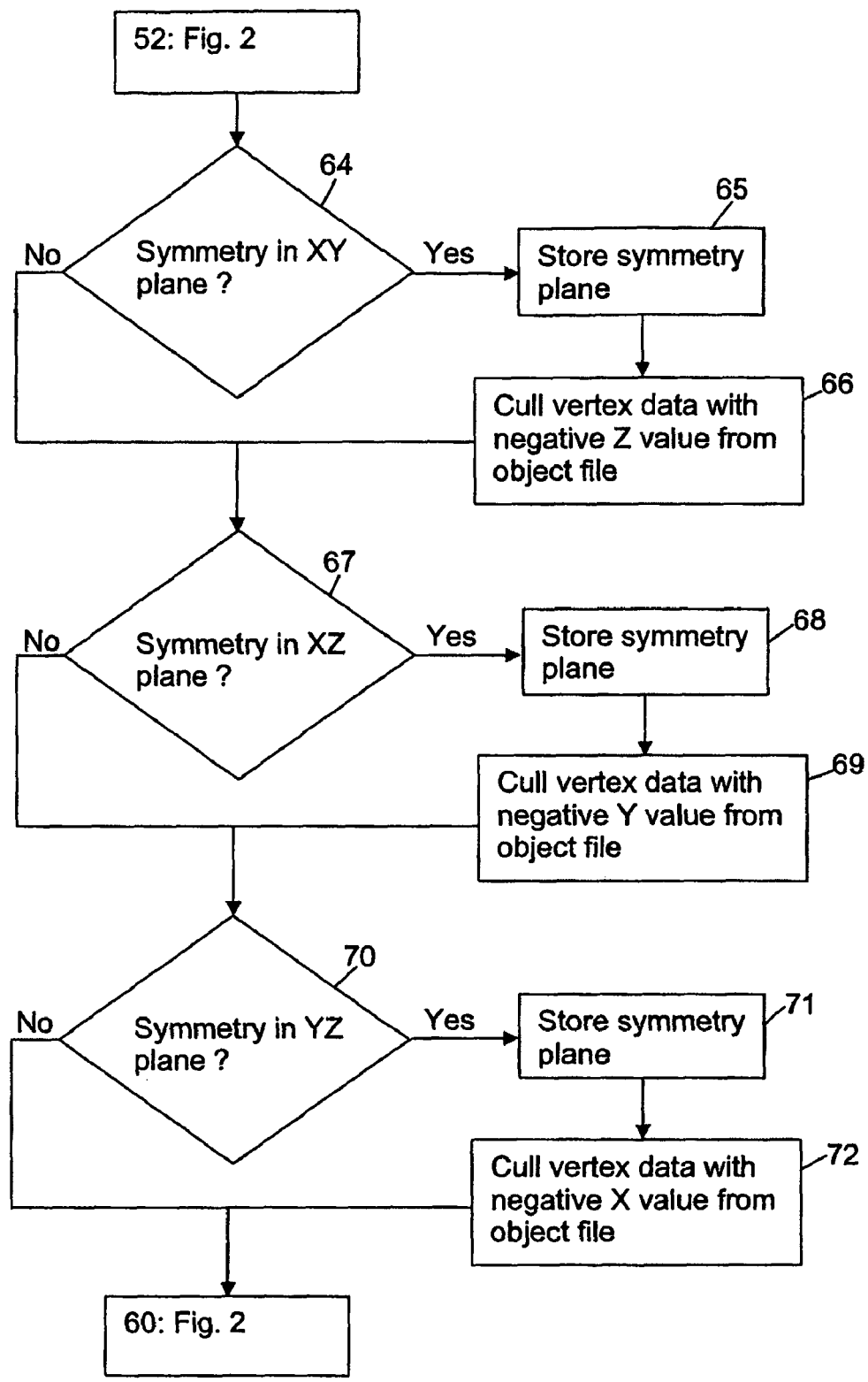
FIG. 3 is a detailed flow chart showing the steps for creating objects files with reduced vertex data by removing mirrored vertices.

The next step, step 55, which is not mandatory to the present embodiment, is shown in more detail in the flowchart in FIG. 3. In step 64 it is determined if the object is symmetrical about the XY plane. This data is usually available from the object file, in particular when the object file has been created using a graphics program or the like. In the unusual circumstance that the object file does not contain such data, e.g. because it reflects a scanned object, it would be possible to identify planes of symmetry by assuming a plane of symmetry Z=0 and to check for every vertex with a positive z-value whether the same vertex exists with the same but negative z-value, and repeating the exercise for planes of symmetry with Y=0 and X=0. Though not shown, it is also possible to include steps to rotate and translate the object so that any axis of symmetry align with one or more of the planes X=0, Y=0 or Z=0.

When symmetry about the XY plane is present, the plane of symmetry is stored in the object file in step 65, and all vertices with negative Z-axis values are culled from the object file in step 66. Hereto, the vertex indices are reordered so that each mirrored vertex below the symmetry plane comes after its pair above the symmetry plane, then the ones above the symmetry plane are marked so that they have a mirrored counterpart.

After step 65, or when no symmetry in the XY plane is detected, it is determined if the object is symmetrical in the XZ plane in step 67.

When symmetry in the XZ plane is present, the plane of symmetry is stored in the object file in step 68, and all vertices with negative Y-axis values are culled from the object file in step 69.

After step 69, or when no symmetry in the XZ plane is detected, it is determined if the object is symmetrical in the YZ plane in step 70.

When symmetry in the YZ plane is present, the plane of symmetry is stored in the object file in step 71, and all vertices with negative X-axis values are culled from the object file in step 72.

After step 72, or when no symmetry in the YZ plane is detected, control is moved to step 60 in FIG. 2. The amount of vertex data in the object file can thus be reduced by up to a factor of 8 depending on the number of symmetry planes of the object. In practice, almost all objects used in computer graphics have at least one and often two planes of symmetry, and thus a reduction in the amount of vertex data by a factor 2 to 4 is achievable. This is of significant importance when storing animated 3-D graphics on e.g. a mobile phone 1 as shown in FIG. 8 because of its relatively limited memory capacity.

When it is decided in step 60 that all objects 1-N have been thus processed, the object files are ready to be transferred from the workstation to the mobile phone 1 for display.

The data transfer from the workstation to the mobile phone could be via IR signals (IrDA) or RF signals, (Bluetooth) over the air as messages (SMS or MMS), cable, native (at production site) or any other suitable medium.

Figure 8:
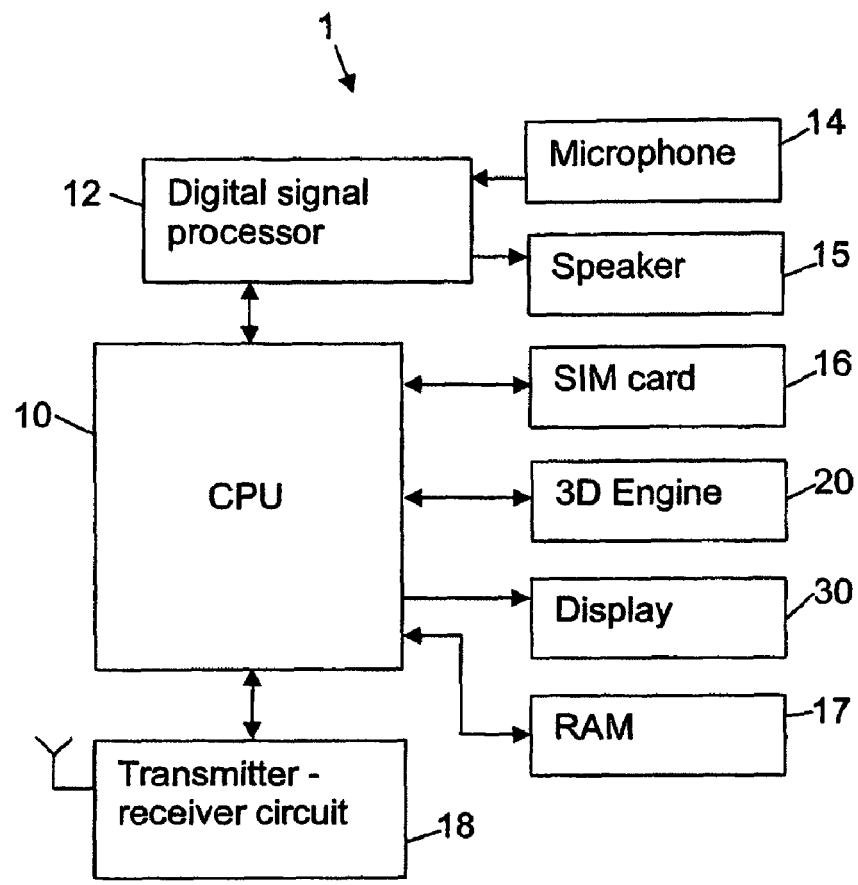
FIG. 8 is a block diagram of a mobile phone.
Figure 6:
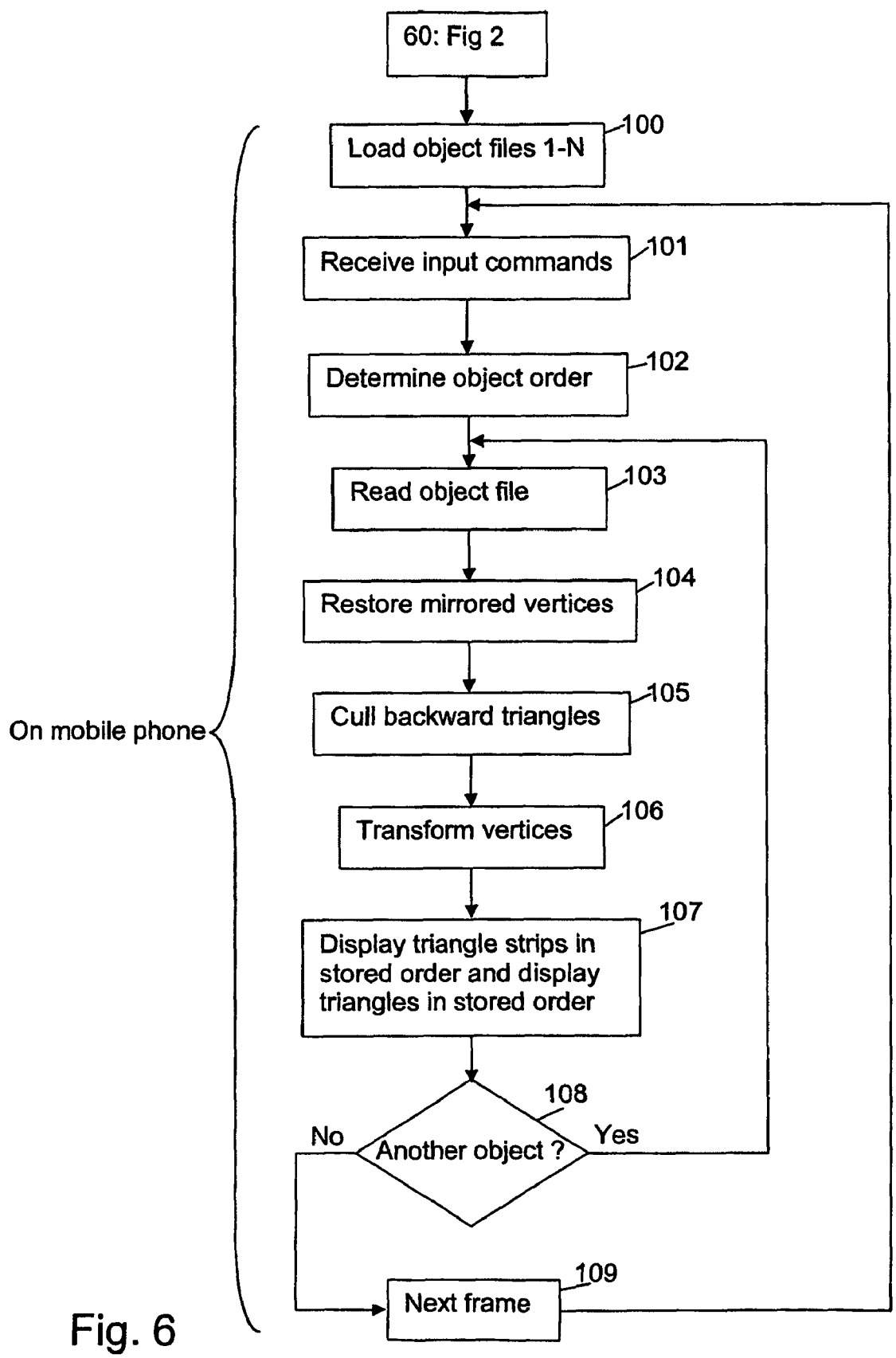
FIG. 6 is a flow chart showing the steps for displaying the three-dimensional objects as a two-dimensional image on a second device.

As shown in FIG. 6, the object files 1-N are loaded onto the mobile phone in step 100 and stored on the random access memory (RAM) 17 of the mobile phone 1 (cf. FIG. 8). The mobile phone is provided with a processor (CPU) 10 that is capable to write data to and read data from the RAM 17. The CPU 10 controls a digital signal processor 12 coupled to a microphone 14 and a speaker 15. The mobile phone 1 is further provided with a subscriber identity module (SIM card) 16. An RF transmitter-receiver circuit 18 is also connected to the CPU 10. A software embedded 3-D engine 20 drives the LCD or plasma screen 30.

Figure 7:
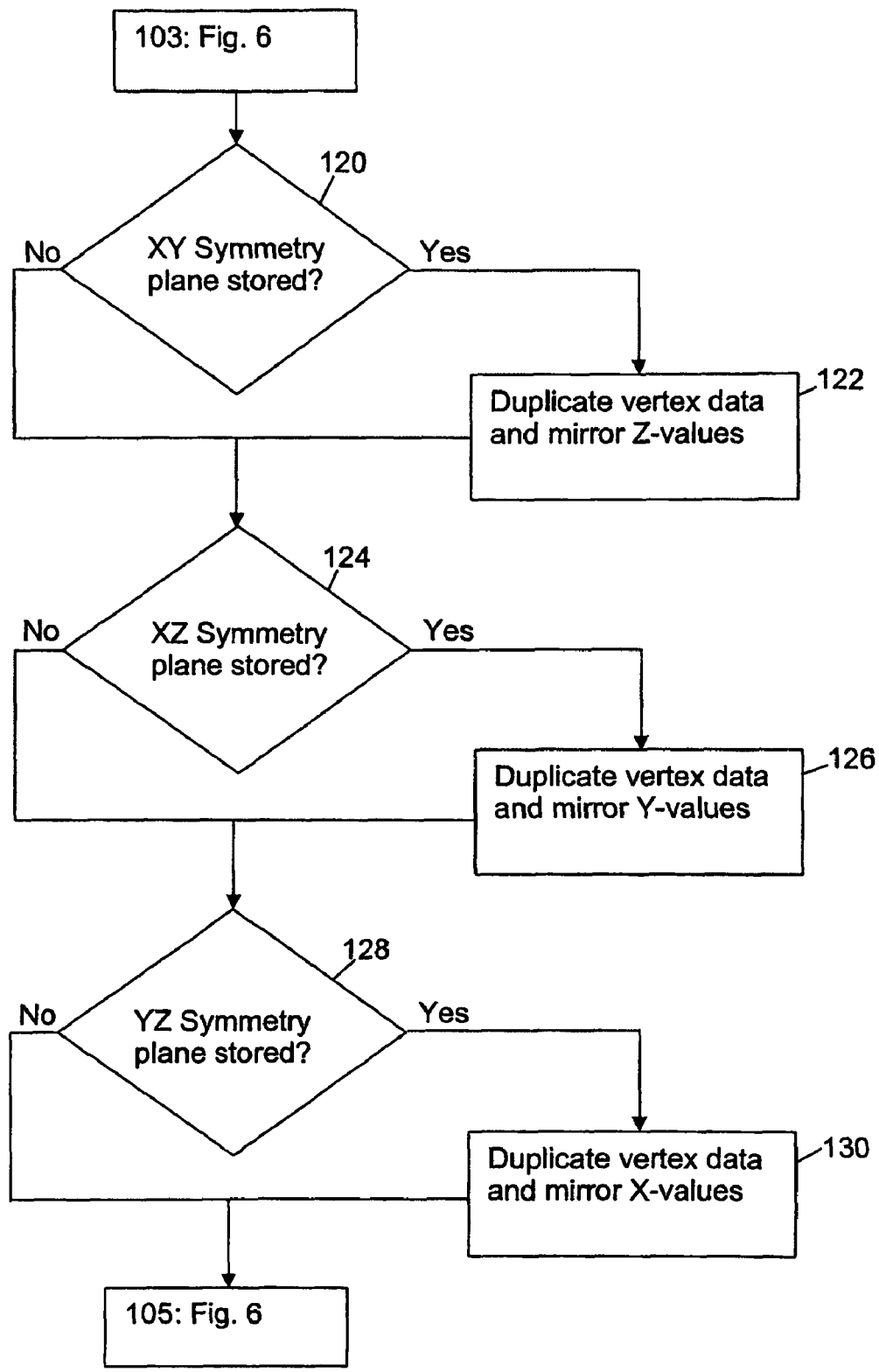
FIG. 7 is a detailed flow chart showing the steps for restoring the triangles removed in the steps shown in FIG. 3.

Since the amount of triangles in the object files 1-N has been reduced on the workstation in step 52, the amount of data is small enough to be stored in the relatively limited RAM 17 of the mobile phone 1. The object files have been prepared in the proper rendering order (HSR tolerant) and thus it is possible to enter the rendering stage as soon as the object order is determined. At step 101 (FIG. 6) input commands are received which essentially define lighting and view parameters. Thereupon, the object rendering order is determined in step 102, preferably by using binary space partitioning techniques. The data of the first (most occluded) object to be rendered are read in step 103. In step 104, the triangles that were removed from one side of a symmetry surface are restored. The procedure is illustrated in more detail in the flowchart shown in FIG. 7.

In step 120 the question is asked whether a symmetry plane in the XY surface is stored in the object file. If the question asked in step 120 is answered in the affirmative, then a new set of vertices is created in step 122 by duplicating all vertex data presently in the object file and flipping the sign of the Z-axis values for the newly created vertices, so that the earlier removed vertices are restored, and the control is moved to step 124. If the question asked in step 120 is answered in the negative, the control is moved directly to step 124.

In step 124 the question is asked whether a symmetry plane in the XZ surface is stored in the object file. If the question asked in step 124 is answered in the affirmative, a new set of vertices is created in step 126 by duplicating all vertex data presently in the object file and flipping the sign of the Y-axis values for the newly created vertices, so that the earlier removed vertices are restored, and the control is moved to step 128. If the question asked in step 124 is answered in the negative, the control is moved directly to step 128.

In step 128 the question is asked whether a symmetry plane in the YZ surface is stored in the object file. If the question asked in step 128 is answered in the affirmative, a new set of vertices is created in step 130 by duplicating all vertex data presently in the object file and flipping the sign of the X-axis values for the newly created vertices, so that the earlier removed vertices are restored, and the control is moved to step 105 (FIG. 6). If the question asked in step 128 is answered in the negative, the control is moved directly to step 105 (FIG. 6). Thus, all the vertices removed from the object file on the workstation in step 52 are restored again.

In step 105 it is determined whether a given triangle's predefined front face is visible with present viewing direction. Hereto, the direction of the front faces of the triangles 1-n in the object file are compared with the viewing direction, by calculating the dot product of the vector of the viewing direction and the normal vector of the respective triangle. When this product is negative the triangle in question is culled since its front surface cannot be seen with the present viewing direction. Thus, the amount of triangles is statistically reduced by 50%.

Alternatively, a usually more accurate, often even faster (as it not necessary to calculate normal, and the direction to camera changes with every triangle as well) way of detecting backfacing triangles is to calculate its area on the screen after projection. If the screen area is negative, the triangle is backfacing.

In step 106 the transformation of vertices of the triangles from model space (i.e. the object file's reference coordinate system) into device space (i.e. the display or screen coordinate system) takes place using a matrix-vector multiplication. Methods and algorithms for vertex transformation are well known in the art and therefore not described here in detail.

When the vertices have been transformed in step 106 the vertex data is sent to the display for viewing in step 107. In step 107 the triangle strips are rendered in the order in which they were created, which in this embodiment corresponds to the order in which they are stored in the object file. The triangles are displayed in the order in which they were added to the respective triangle strip, which in this embodiment corresponds to the order in which they are stored in the object file. Consequently, the triangles can be displayed in the order in which they are stored in the object file without needing to address the hidden surface problem whilst displaying the triangles.

At step 108 the question is asked if another object is to be displayed. If the question asked in step 108 is answered in the affirmative, the control is moved to step 103 at which the data of the next object file are read. Thus, steps 103 to 107 are repeated until all objects have been displayed. When all objects have been displayed, the next frame is to be displayed and control is given to step 101 to receive the input commands for the next frame.

According to another embodiment of the invention, the mirrored vertices are removed as shown in the flowchart of FIG. 3, but the polygons are not stripped, i.e. step 55 in FIG. 2 is omitted. Thus, a reduced size object file is obtained that may be easily stored in the mobile phone, but when displaying the triangles it will be necessary to solve the hidden surface problem. Hereto, the painter's algorithm or the Z-buffering technique could be used on the mobile phone 1, the limits of the processing power of the mobile phone will though be reached relatively quickly.

The efficient techniques of the invention allow real time animated 3-D graphics on devices with relatively limited image processing hardware, such as mobile phones, PDAs and handheld video games. The invention is therefore not limited to the device described in the preferred embodiments (a mobile phone with a SIM card), the invention can be applied any other type of mobile phone or device listed above.

Although the aspects of the disclosed embodiments have been described in detail for purpose of illustration, it is understood that such detail is solely for that purpose, and variations can be made therein by those skilled in the art without departing from the scope of the invention.

What is claimed is:

1. An apparatus comprising:
   a first device configured to receive object files for a rendering of two-dimensional images of three-dimensional objects, the apparatus including a second device having:
   a memory for storing object files containing triangle strips, the strips having been created sequentially in an order; and
   an image processor for displaying said triangle strips on a display in the order in which they have been created;
   wherein the object files are prepared on the first device for the rendering of the two-dimensional images of three-dimensional objects on the second device by processing object files containing data defining triangle primitives representing at least one three-dimensional object to determine a rendering order in which said triangle primitives may be rendered for creating a two-dimensional image in which the hidden surfaces are removed by:

a) storing a plurality of planar triangle primitives corresponding to a plurality of surface portions of said at least one object in an object file, wherein said plurality of triangle primitives are represented by vertex data arranged according to an original order;

b) selecting a triangle that does not potentially occlude any of the unprocessed triangles to start a triangle strip;

c) selecting a neighboring triangle to add to the last triangle in the triangle strip;

d) determining whether the selected neighboring triangle has the potential to occlude any of the unprocessed triangles;

e) adding the selected neighboring triangle to the strip and going back to step c) if the selected neighboring triangle does not have the potential to occlude any of the unprocessed triangles;

f) going back to step b) to start a new triangle strip if the selected neighboring triangle has the potential to occlude any of the unprocessed triangles; and g) repeating steps b) to f) until all the triangles in the object tile are processed.

2. The apparatus according to claim 1, wherein individual triangles have been added sequentially in an order into respective ones of the triangle strips, and the triangles in the triangle strips are displayed in the same order as they were added to the strip.

3. The apparatus according to claim 1, wherein a rendering order of said triangles is determined using a binary space partitioning method.

4. The apparatus according to claim 1, wherein the image processor culls all triangles facing backwards relative to the viewing direction.

5. The apparatus according to claim 1, wherein
said image processor is configured for retrieving planes of symmetry stored in an object file, and
said image processor is configured further for duplicating all vertex data present in the object file and flipping a sign of the vertex values on an axis orthogonal to a respective plane of symmetry for newly created triangles.

6. The apparatus according to claim 1, in which the image rendering process is carried out by a main CPU of the first device, and all further image rendering is accomplished by embedded software.

7. The apparatus of claim 1 wherein the apparatus comprises a mobile communication terminal.

* * * * *

UNITED STATES PATENT AND TRADEMARK OFFICE
CERTIFICATE OF CORRECTION

PATENT NO. : 7,733,341 B2 Page 1 of 1
APPLICATION NO. : 12/130193
DATED : June 8, 2010
INVENTOR(S) : Pulli et al.

It is certified that error appears in the above-identified patent and that said Letters Patent is hereby corrected as shown below:

Title page: item [75] Inventors: delete "Kari Pulli, Palo Alto, CA (US)" and insert --Kari Pulli, Cambridge, MA (FI)-- therefor Signed and Sealed this Seventeenth Day of August, 2010

David J. Kappos
*Director of the United States Patent and Trademark Office*